Oct. 5, 1965   A. M. LOCKIE   3,210,705
WINDING FOR ELECTRICAL APPARATUS
Original Filed June 30, 1958

INVENTOR
Arthur M. Lockie
BY
J. E. Browder
ATTORNEY

3,210,705
WINDING FOR ELECTRICAL APPARATUS

Arthur M. Lockie, Sharon, Pa., assignor to Westinghouse Electric Corporation, Pittsburgh, Pa., a corporation of Pennsylvania
Continuation of application Ser. No. 745,555, June 30, 1958. This application Nov. 12, 1963, Ser. No. 322,820
11 Claims. (Cl. 336—183)

This application is a continuation of copending application Serial No. 745,555, now abandoned, filed June 30, 1958, in the name of Arthur M. Lockie, and assigned to the same assignee as this application.

This invention relates to windings for electrical inductive apparatus, such as transformers and, more particularly, to an arrangement of the conductors in the windings of such apparatus.

A conventional transformer which is utilized as part of an electrical distribution system has several disadvantages. One disadvantage of a conventional transformer is that the exciting current of the transformer adds to the lagging power factor reactive load on the distribution system, thus reducing the efficiency and the useful load-carrying ability of the system while adding to the required power generating capacity of the system. A second disadvantage of a conventional transformer relates to the construction of the windings of the transformer. In the past, it has been impractical to obtain extremely close coupling between windings of a conventional transformer. Therefore, the reactive component of the impedance of the transformer is increased so that the over-all impedance of the transformer is relatively high, thus increasing the voltage drop through the transformer and adversely affecting the voltage regulation of the distribution system.

Other disadvantages of the construction of a conventional transformer used in distribution systems stem from the fact that the different windings are formed as separate assemblies. Therefore, the resistance to relative motion of the coils or windings under the influence of axial short circuit stresses must be developed at the boundary between the different winding assemblies or by external supports or bracing. Since there is only one boundary layer between each pair of assemblies, the resistance to relative motion of the different windings must be concentrated at this boundary. In addition, much of the insulation between conductors and between windings of a conventional transformer of this type is not subject to uniform electrical stress. Since it is not generally practical or economical to design or grade the insulation to suit the varying electrical stress, each component of the insulation system must be designed for the maximum stress to which any particular part of the component is exposed. This method of insulating the conductors and the windings for a conventional transformer results in an inefficient utilization of the insulation, and, therefore, in a relatively poor space factor in the transformer. It is, therefore, desirable to provide a construction for electrical inductive apparatus, such as a transformer, which overcomes or reduces the above disadvantages.

It is an object of this invention to provide a new and improved winding arrangement for electrical apparatus.

Another object of this invention is to provide a predetermined capacitance between the windings of an electrical inductive apparatus, such as a transformer.

A further object of this invention is to provide a transformer having a substantially uniform voltage stress between its windings and in which the insulation between the windings and the conductors of the windings would be more efficiently utilized.

Other objects of the invention will, in part, be obvious and will, in part, appear hereinafter.

For a fuller understanding of the nature and objects of the invention, reference should be had to the following detailed description, taken in connection with the accompanying drawing, in which.

Figure 1:
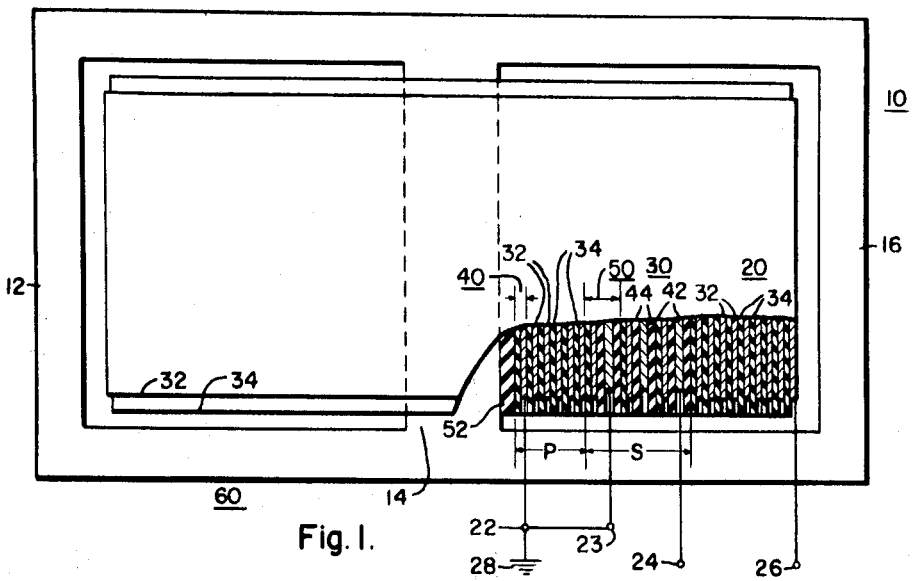
FIGURE 1 is a front elevational view, partly in section and partly schematic, of a transformer core and coil assembly, illustrating one embodiment of this invention.

Referring now to the drawing and FIG. 1 in particular, there is illustrated a transformer core and coil assembly 10 including a first or primary winding 20 and a second or secondary winding 30 which are disposed on a magnetic core 60. The magnetic core 60 includes two windows which are formed by the first and second outer leg members 12 and 16 and a middle or winding leg member 14 on which the windings 20 and 30 are disposed. The winding leg member 14 is enclosed or surrounded by a tube or barrier 52 on which the windings 20 and 30 are wound. In the arrangement illustrated in FIGS. 1, 2 and 3, voltage transformation is obtained by having a different number of turns in the first winding 20 and the second winding 30.

In particular, the first or primary winding 20 comprises a plurality of turns of a first layer of conducting sheet material 32 and a second layer of insulating sheet material 34 which are spirally wound together around a portion of the magnetic core 60, specifically the winding leg member 14 in this case. The width of the insulating sheet or film material 34 is greater than the width of the layer of conducting sheet or foil material 32 in order to provide additional "creep" insulation between the adjacent turns of the primary winding 20. The tube 52 provides mechanical support for the primary winding 20 and may be formed from insulating material in certain applications to insulate the winding 20 from the winding leg member 14 of the magnetic core 60. The conducting material 32 is of the general type in which the axial dimension of the material is relatively large compared to the radial dimension.

In winding the primary winding 20, a first portion, including a plurality of turns, is wound as indicated at P. Each turn of the first portion P of the primary winding 20, as indicated at 40, includes only a layer of the insulating material 34 and a layer of the conducting material 32.

After the first portion P of the primary winding 20 has been wound, including a predetermined plurality of turns, the second or secondary winding 30 is started. The secondary winding 30 comprises a plurality of turns each including two layers of insulating sheet or film material 44 and a layer of conducting sheet or foil material 42 disposed therebetween. After the first portion P of the primary winding 20 has been wound, the three layers of material which comprise the secondary winding 30 are added to the two layers of material which comprise the primary winding 20 and the five layers of material are then wound simultaneously. The turns of the secondary winding 30 are continuously interleaved with the adjacent turns of the primary winding 20 as indicated at S in FIG. 1. In the portion of the primary winding 20 in which the turns of the secondary winding 30 are wound simultaneously, each turn of the combined primary and secondary winding, as indicated at 50, includes a layer of the insulating material 34 and a layer of the conducting material 32 which comprise the primary winding 20 and two layers of the insulating material 44 and the layer of conducting material 42 which comprise the secondary winding 30. Similarly, the width of the layers of insulating sheet material 44 of the winding 30 is greater than the width of the layer of conducting sheet material 42.

As decribed, the turns of the secondary winding 30 are wound simultaneously with a portion of the turns of the primary winding 20 and continuously interleaved with the adjacent turns of the primary winding 20 for a purpose which will be explained hereinafter. After the combined turns of the primary winding 20 and the secondary winding 30 have been wound, the final portion of the primary winding 20 is wound with a plurality of turns, each of which includes only the layer of insulating sheet material 34 and the layer of conducting sheet material 32. The turns of the secondary winding 30, therefore, start and stop at first and second predetermined turns of the primary winding 20.

One point of each of the windings 20 and 30 may be connected to a common terminal or point for reasons which will be explained hereinafter. As illustrated in FIG. 1, the inner end of the conducting sheet material 32 of the primary winding 20 is connected to the terminal 22. The inner end of the layer of conducting sheet material 42 of the secondary winding 30 is connected to the terminal 23. The outer end of the layer of conducting material 42 of the secondary winding 30 is connected to the terminal 24. The outer end of the layer of conducting material 32 of the primary winding 20 is connected to the terminal 26. The inner end of the primary winding 20 at the terminal 22 and the inner end of the secondary winding 30 at the terminal 23 are connected together and to a common terminal, as indicated by the ground connection 28. It is to be understood that other methods of connecting a point of each of the windings 20 and 30 to a common point may be used in practicing this invention. For example, the inner end of the primary winding 20 could be connected to the ground connection 28 and the midpoint (not shown) of the winding 30 might also be connected to the ground connection 28 in a particular application.

The manner in which the primary winding 20 and the secondary winding 30 are constructed or arranged with the adjacent turns of the respective windings being continuously interleaved has several important results. First, if a potential is applied to the primary winding 20 between the terminals 22 and 26, the potential will distribute itself substantially uniformly among the turns of the primary winding 20. In other words, if a potential V is applied to the primary winding 20 having N number of turns, the potential between each turn of the primary winding 20 will be substantially equal to $V/N$. If the inner end of the primary winding 20 is connected to the ground connection or terminal 28 as shown in FIG. 1, the voltage associated with each of the turns of the primary winding 20 gradually increases in accordance with the number of turns between any particular turn of the primary winding 20 and the inner end of the primary winding 20 which is connected to the ground terminal 28. For example, if the number of turns included in the first portion P of the primary winding 20 is "$a$," the voltage associated with the turn of the primary winding 20 at which the turns of the secondary winding 30 start will be substantially equal to "$a$" times $V/N$. Therefore, the potential difference between the first turn at the inner end of the secondary winding 30 and the adjacent turn of the primary winding 20 will be equal to "$a$" times $V/N$, since the inner end of the secondary winding 30 is also connected to the ground connection 28. Since the adjacent turns of the primary winding 20 and the secondary winding 30 are continuously interleaved and wound together turn for turn, the potential difference between the adjacent turns of the primary winding 20 and the secondary winding 30 will be substantially uniform or at a predetermined value. This is because the voltage associated with the turns of the primary winding 20 increases uniformly in accordance with the number of turns between a particular turn of the primary winding 20 and the inner end of the primary winding 20 and the voltage associated with the turns of the secondary winding 30 increases at a corresponding rate. The potential difference, therefore, between the adjacent turns of the primary winding 20 and the secondary winding 30 will be substantially uniform and equal to "$a$" times $V/N$.

Figures 2, 3:
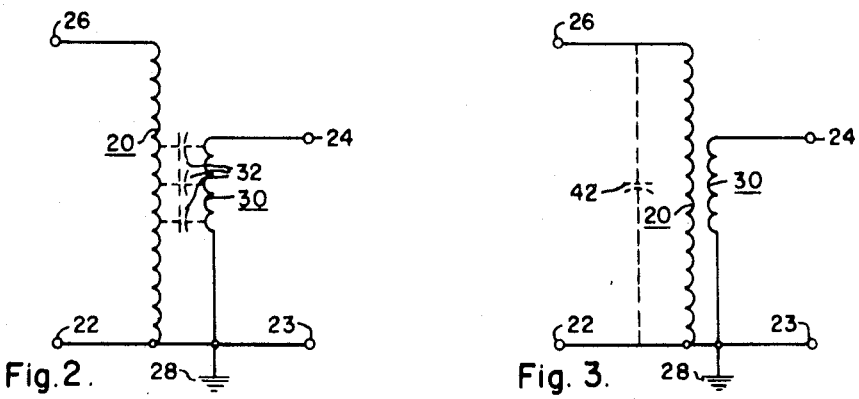
FIGS. 2 and 3 are equivalent schematic diagrams of the windings of the transformer core and coil assembly shown in FIG. 1.

Referring to FIGS. 2 and 3, there are illustrated two equivalent schematic diagrams of the windings 20 and 30 of the transformer core and coil assembly 10 shown in FIG. 1. Because of the insulating and conducting materials employed and the manner in which the windings 20 and 30 are continuously interleaved, a predetermined capacitance results between the adjacent turns of the windings 20 and 30 as shown in FIG. 2. As illustrated, the primary winding 20 is connected across the input terminals 26 and 22. The secondary winding 30 is connected across the output terminals 23 and 24. The terminals 22 and 23 are connected to the common ground connection as indicated at 28. The inherent distributed capacitance between the adjacent turns of the primary winding 20 and the secondary winding 30 is indicated at 32.

The capacitance 32 varies with several factors. For example, the capacitance 32 varies with the effective area of the layers of conducting material 32 and 42 included in the primary winding 20 and the secondary winding 30, respectively. The capacitance also varies with the dielectric constant and the thickness of the layers of insulating material 34 and 44 included with the primary winding 20 and the secondary winding 30, respectively. Since the current through the distributed capacitance 32 is independent of any current which flows to a load (not shown) connected across the secondary winding 30 at the terminals 23 and 24 when a potential is applied across the primary winding 20 at the terminals 22 and 26, the equivalent schematic diagram of the windings 20 and 30 may be represented as shown in FIG. 3. The effect of the distributed capacitance between the adjacent turns of the windings 20 and 30 may be represented as an effective capacitance 42, as shown in FIG. 3, which has the effect of a capacitance connected in shunt or in parallel with the primary winding 20.

As described above, the potential difference across the insulation or dielectric material between adjacent turns of the primary winding 20 and the secondary winding 30 is substantially uniform because the turns of the windings 20 and 30 are continuously interleavered. A uniform potential stress between the adjacent turns of the windings 20 and 30 is desirable in order to obtain an increased effect of the effective capacitance between the adjacent turns of the windings 20 and 30, considered as a leading power factor reactance, which offsets the lagging power factor reactive load present in a conventional transformer of this type because of the exciting current. The effect of any capitance which exists between the windings of a conventional transformer of this type is greatly diminished because the thickness of the insulation between the windings, considered as a dielectric, remains substantially constant while the effective potential difference across the insulation between the windings, considered as electrodes, varies from one end of the windings to the other. In a transformer core and coil assembly as disclosed on the other hand, the potential difference between the adjacent turns of the primary winding 20 and the secondary winding 30 across the insulation between the adjacent turns considered as a dielectric, remains substantially uniform over the windings.

Since the insulation between the windings of a conventional transformer remains substantially constant over the windings while the voltage between the adjacent turns of the windings varies, the insulation is excessive or inefficiently employed in parts of the windings since the insulation must be designed to withstand the maximum voltage stress encountered in any particular part of the windings. On the other hand, the insulation between the primary winding 20 and the secondary winding 30 as disclosed is efficiently utilized since the potential difference existing between the adjacent turns of the respective windings remains substantially uniform or at a predetermined value for which the insulation is designed.

The effect of the capacitance provided between the windings 20 and 30 as a reactance also varies with the square of the potential of the voltage applied across the insulation between the windings 20 and 30, considered as a dielectric material. The turns of the secondary winding 30 are only wound simultaneously with a portion of the turns of the primary winding 20. The point at which the turns of the secondary winding 30 are disposed either at the inner end of the primary winding 20 or toward the outer end of the primary winding 20 or intermediate the ends of the primary winding 20 determines the potential applied across the insulation between the adjacent turns of the primary winding 20 and the secondary winding 30, considered as a dielectric. One point of each of the windings 20 and 30 may be connected to a common terminal in order to provide a charging path to charge the insulation between the adjacent turns of the windings 20 and 30 when a potential is applied across the primary winding 20 and a corresponding potential difference exists between the adjacent turns of the windings 20 and 30.

Figure 4:
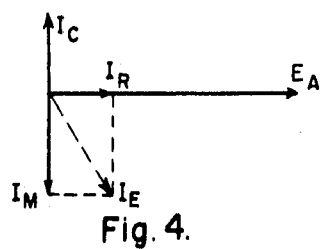
FIG. 4 is a vector diagram of some of the voltage and currents of the transformer core and coil assembly shown in FIG. 1.

Referring to the vector diagram of FIG. 4, the manner in which the capacitance provided between the primary winding 20 and the secondary winding 30 affects the operation of the core and coil assembly 10 shown in FIG. 1 is illustrated. The vector $E_A$ represents the applied potential across the primary winding 20 between the terminals 22 and 26. The vector $I_E$ represents the normal lagging power factor exciting current that would flow in the core and coil assembly 10 in the absence of the capacitance provided between the primary winding 20 and the secondary winding 30. The vectors $I_R$ and $I_M$ represents the core-loss component and the magnetizing component respectively of the exciting current $I_E$. The vector $I_C$ represents the leading power factor current drawn by the effective capacitance between the windings 20 and 30 when the potential $E_A$ is applied to the primary winding 20. The magnetizing component $I_M$ of exciting current $I_E$ lags the applied potential $E_A$ by 90°. The core-loss component $I_R$ of the exciting current $I_E$ is in phase with the applied voltage $E_A$. The leading power factor current drawn by the capacitance between the windings 20 and 30, $I_C$, leads the applied potential $E_A$ by an angle of substantially 90°. Since the magnetizing component $I_M$ of the exciting current $I_E$ and the leading power factor current $I_C$ drawn by the capacitance between the windings 20 and 30 are substantially 180° out-of-phase, the core and coil assembly 10 may be designed so that the leading power factor current $I_C$ substantially cancels the magnetizing component $I_M$ of the exciting current $I_E$ or the capacitance provided may be such as to draw a leading power factor current $I_C$ which is even larger than the magnetizing component $I_M$ of the exciting current $I_E$. This means that even when the transformer core and coil assembly 10 is not connected to a load across the secondary winding 30, the transformer core and coil assembly may be designed to draw a leading power factor no-load current. In the latter case, the leading power factor no-load current drawn by a transformer core and coil assembly as disclosed will offset the lagging power factor current being drawn elsewhere in a distribution system to thereby increase the over-all efficiency of the distribution system.

In summary, an electrical inductive apparatus, such as a transformer, as disclosed would include at least two windings whose conducting elements and insulation are wound as disclosed and whose turns are continuously interleaved. Two important results of this construction are that a uniform potential difference exists between the adjacent turns of the windings to permit more efficient use of the insulation provided and that the resulting capacitance between the windings increases the over-all efficiency of a distribution system.

It is to be understood that other forms of electrical inductive apparatus incorporating the teachings of the invention may be provided with different arrangements of the insulation between the turns of the respective windings. For example, instead of using separate layers of sheet or film insulation between the turns of the primary winding 20, the layer of conducting sheet material 32 may be coated with an insulating material, such as enamel, and the edges of the turns could be coated with other suitable insulating material, such as resins, to provide insulation between the turns of the winding and between the winding and the core structure or ground. In addition, while the windings as disclosed inherently have excellent heat dissipation characteristics, it may be advisable or necessary in larger ratings to incorporate or wind in conventional duct formers to provide additional cooling. Since there is no potential difference along the vertical axis of the turns of the winding, the latter duct formers could be formed from a material having a high thermal conductivity, such as a metal bar.

It is also to be understood that in higher ratings of transformers where the use of relatively massive conducting material is objectionable because of mechanical difficulty in winding turns of such material or because of excessive eddy current losses, two or more winding groups may be wound in accordance with the teachings of this invention and assembled on a common core. An alternative arrangement would replace the single layers of conducting material with a plurality of layers of conducting material adjacent to each other in a radial direction and wound into a single winding group. It is to be noted that additional insulation of the conventional type (not shown) may be added between the windings 20 and 30 shown in FIG. 1 and the magnetic core 60 or where required in particular parts of the windings 20 and 30. It is also to be understood that one or more of the windings included in a transformer as disclosed may include layers of conducting material divided transversely with respect to the vertical axis of the windings. In addition, the over-all shape of the windings included in a group as disclosed may be circular, rectangular or any other shape incorporating the windings as disclosed.

The apparatus embodying the teachings of this invention has several advantages. First, the magnetizing component of the lagging power factor exciting current normally drawn by a conventional transformer may either be reduced or eliminated by the capacitance provided between the windings of a transformer as disclosed or a transformer may be designed, as disclosed, to carry a leading power factor current under no-load conditions, thus increasing the over-all efficiency of a distribution system. A transformer, as disclosed, if designed to carry a leading power factor no-load current would eliminate the necessity for a particular value of separate power factor correcting capacitors. The benefit of the capacitance provided between the windings is, as already mentioned, more effectively utilized because of the uniform voltage stress existing between the adjacent turns of the respective windings.

Second, the intimate or extremely close coupling between the windings of a transformer as disclosed and the associated improved space factor reduces leakage flux in the transformer and the associated reactive component of the impedance of the transformer. Therefore, the voltage drop across the transformer is reduced and the voltage regulation of a distribution system is improved.

Third, the space factor of a transformer as disclosed is improved because the insulation between the windings of the transformer is uniformly stressed to more efficiently utilize the insulation.

Fourth, the mechanical strength of a transformer as disclosed, is improved since the horizontal center line of all the turns of the respective windings lie in the same plane to thereby minimize the axial forces between the windings of the transformer. For that reason, changing taps on the windings of a transformer as disclosed does not change or have any effect on the axial forces present between the windings or the turns of the windings. Furthermore, the resistance to relative motion or movement of the windings of the transformer as disclosed under axial short circuit stresses is developed over a number of boundary surfaces, each having a relatively large area of contact, and is sufficient to substantially eliminate the need for external supports or braces to prevent relative movement of the windings.

Since numerous changes may be made in the above described apparatus and different embodiments of the invention may be made without departing from the spirit and scope thereof, it is intended that all the matter contained in the foregoing description or shown in the accompanying drawing shall be interpreted as illustrative and not in a limiting sense.

I claim as my invention:

1. Electrical inductive apparatus comprising a magnetic core, a first winding including a plurality of turns of electrically conductive sheet material disposed in inductive relation with said magnetic core, and a second winding including a plurality of turns of electrically conductive sheet material, one point of each of said first and second windings being connected in common, the turns of said second winding being continuously interleaved with a portion of the turns of said first winding, means insulating the turns of each winding from each other and from the other winding, the interleaving turns of said first and second windings providing a predetermined capacitance which is effectively shunt connected across said first winding, said inductive apparatus being capable of transforming voltage dependent upon the ratio of turns in said first and second windings.

2. A transformer comprising a magnetic core including a winding leg member, a first winding comprising a plurality of turns of electrically conductive strip material and insulating sheet material spirally wound together around said winding leg member, and a second winding comprising a plurality of turns of electrically conductive sheet strip material and insulating sheet material spirally wound together around said winding leg member, the turns of said second winding being continuously interleaved with at least a portion of the turns of said first winding whereby the potential stress between the adjacent turns of said first and second windings is substantially at a predetermined value for a given potential applied to said first winding and a predetermined capacitance is provided between said first and second windings, one point of each of said windings being connected to a common point to provide a charging path for said capacitance, said transformer being capable of transforming voltage dependent upon the ratio of turns in said first and second windings.

3. Electrical inductive apparatus comprising a magnetic core having at least one winding leg member, a first winding comprising a plurality of convolutions of electrically conductive foil material having a coating of insulating material thereon, said first winding being wound around the winding leg member of said magnetic core, and a second winding comprising a plurality of convolutions of electrically conductive foil material, one point of each of said windings being connected to a common terminal, the convolutions of said second winding being wound around the winding leg member of said magnetic core, the convolutions of a portion of said first winding being continuously interleaved with predetermined convolutions of said second winding to provide a predetermined capacitance between the convolutions of said first winding and the convolutions of said second winding, said inductive apparatus being capable of transforming voltage dependent upon the ratio of the number of convolutions in said first and second winding.

4. A transformer comprising a magnetic core, a first winding comprising a plurality of turns of electrically conductive sheet material having a coating of insulation on at least one side spirally wound around a portion of said core, and a second winding comprising a plurality of turns of electrically conductive sheet material having a coating of insulation on at least one side, one end of said first winding being electrically connected to one end of said second winding, the turns of said second winding starting and stopping at first and second predetermined turns, respectively, of said first winding and being continuously interleaved with the turns of said first winding to provide a predetermined capacitance between said first and second windings, said transformer being capable of transforming voltage dependent upon the ratio of turns in said first and second windings.

5. A transformer comprising a first winding having a plurality of turns of a first layer of metallic conductive sheet material and a second layer of insulating sheet material spirally wound together about an axis, and a second winding comprising a plurality of turns, the turns of said second winding each including two layers of insulating sheet material and a layer of metallic conductive sheet material disposed therebetween, one point of said first winding and one point of said second winding being connected to a common terminal, the turns of said second winding starting and stopping at first and second predetermined turns, respectively, of said first winding and being continuously interleaved with the adjacent turns of said first winding to provide a substantially uniform potential difference between the adjacent turns of said first and second windings when a potential is applied to said first winding, and to provide a predetermined capacitance between the adjacent turns of said first and second windings, the common connection of one point of each of said first and second windings providing a charging path for said capacitance, said transformer being capable of transforming voltage dependent upon the ratio of turns in said first and second windings.

6. A transformer for connection between first and second alternating current circuits, comprising a magnetic core having a winding leg member, a first winding comprising a plurality of turns of a first layer of electrically conductive material whose axial dimension is large relative to its radial dimension and a second layer of insulating sheet material spirally wound together about said winding leg member, a second winding comprising a plurality of turns of a first layer of electrically conductive sheet material and two layers of insulating sheet material disposed on opposite sides of said layer of electrically conductive material, a common terminal, one end of each of said windings being connected to said common terminal, the other ends of said first and second windings being adapted to be connected in circuit relation with said first and second alternating circuits, respectively, the turns of said second winding being continuously interleaved with a portion of the turns of said first winding to provide a substantially uniform voltage stress between the adjacent turns of said first and second windings and to provide a predetermined capacitance between the adjacent turns of said first and second windings, the common connection of one end of each of said first and second windings providing a charging path for said capacitance, said transformer being capable of transforming voltage dependent upon the ratio of turns in said first and second windings.

7. A transformer comprising input and output terminals, primary and secondary windings each including metallic conductive sheet material spirally wound together in interleaved relation, the turns of one of said windings extending beyond the turns of the other winding, means insulating the turns of each winding from each other and from the other winding, the adjacent turns of said interleaved primary and secondary windings providing a predetermined capacitance, said primary winding being connected to said secondary winding to provide a charging path for said predetermined capacitance, said input terminals being connected to said primary winding, and said output terminals being connected to said secondary winding to provide an output which is dependent upon the ratio of turns in said primary and secondary windings, said predetermined capacitance being effectively connected in shunt with one of said windings.

8. A transformer comprising input and output terminals, primary and secondary windings each including metallic conductive sheet material spirally wound together in interleaved relation, the turns of one of said windings extending beyond the turns of the other winding at least at one end, means insulating the turns of each winding from each other and from the other winding, one of said input terminals being connected to both of said windings adjacent one end thereof, the other of said input terminals being connected to the primary winding adjacent the other end thereof, said windings providing a predetermined capacitance between the adjacent turns thereof, and said output terminals being connected to said secondary winding to provide an output which is dependent upon the ratio of turns in said primary and secondary windings but including said capacitance.

9. A transformer comprising input and output terminals, primary and secondary windings each including metallic conductive sheet material spirally wound together in interleaved relation, the turns of one of said windings extending beyond the turns of the other winding at least at one end, means insulating the turns of each winding from each other and from the other winding, one of said input terminals being grounded and connected to both of said windings adjacent one end thereof, the other of said input terminals being connected to the primary winding adjacent the other end thereof, said interleaved windings providing a predetermined capacitance between the adjacent turns thereof which is effectively connected in shunt with one of said windings, and said output terminals being connected to said secondary winding to provide an output which is dependent upon the ratio of turns in said primary and secondary windings but including said capacitance.

10. A transformer comprising input and output terminals, primary and secondary windings, said primary and secondary windings each including metallic conductive sheet material spirally wound together in interleaved relation, the turns of one of said windings extending beyond the turns of the other winding at both ends thereof, said primary winding being electrically connected to said secondary winding, means insulating the turns of each winding from each other and from the other winding, said input terminals being conected to said primary winding, said primary and secondary windings providing a predetermined capacitance between the adjacent turns thereof which is effectively connected in shunt with said primary winding, and said output terminals being connected to said secondary winding to provide an output which is dependent upon the ratio of turns in said primary and secondary windings but including said capacitance.

11. A transformer comprising input and output terminals, a plurality of windings each including metallic conductive sheet material spirally wound together in interleaved relation, the turns of one of said windings extending beyond the turns of another of said windings at least at one end, means insulating the turns of each winding from each other and from the other windings, said input terminals being connected to two of said windings, respectively, so that said two windings provide a predetermined distributed capacitance between the adjacent turns thereof, and said output terminals being connected to one of said two windings to provide an output which is dependent upon the ratio of turns in said two windings but including said capacitance.

References Cited by the Examiner

UNITED STATES PATENTS

| | | | |
|---|---|---|---|
| 2,521,513 | 9/50 | Gray | 336—165 X |
| 2,577,707 | 12/51 | Kerns et al. | 336—223 X |
| 2,863,130 | 12/58 | Gray et al. | 336—223 X |
| 3,068,433 | 12/62 | Wroblewski et al. | 336—223 X |
| 3,078,411 | 2/63 | Book | 336—69 X |

JOHN F. BURNS, *Primary Examiner.*

LARAMIE E. ASKIN, *Examiner.*